United States Patent
Chang et al.

(10) Patent No.: US 7,008,975 B2
(45) Date of Patent: *Mar. 7, 2006

(54) LIGHT-CURABLE RESIN COMPOSITION HAVING ANTISTATIC PROPERTY

(75) Inventors: Do-hoon Chang, Seoul (KR); Myong-do Ro, Gyeonggi-do (KR); Du-seop Yoon, Gyeonggi-do (KR); In-sik Park, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 10/951,616

(22) Filed: Sep. 29, 2004

(65) Prior Publication Data

US 2005/0043427 A1    Feb. 24, 2005

Related U.S. Application Data

(62) Division of application No. 10/317,212, filed on Dec. 12, 2002, now Pat. No. 6,815,034.

(30) Foreign Application Priority Data

Apr. 22, 2002  (KR) .............................. 2002-21950

(51) Int. Cl.
*C08F 2/50* (2006.01)
*C08K 3/22* (2006.01)

(52) U.S. Cl. .......................... 522/16; 522/26; 522/83; 522/182

(58) Field of Classification Search ................. 522/16, 522/26, 83, 84, 80, 96, 103, 107, 99, 182, 522/183

See application file for complete search history.

(56) References Cited

U.S. PATENT DOCUMENTS

| | | |
|---|---|---|
| 4,229,274 A | 10/1980 | Carlblom |
| 4,519,883 A * | 5/1985 | Via .............................. 522/30 |
| 4,671,978 A | 6/1987 | Kato et al. |
| 5,568,466 A | 10/1996 | Komaki et al. |
| 5,705,247 A | 1/1998 | Arai et al. |
| 6,210,858 B1 | 4/2001 | Yasuda et al. |
| 6,329,058 B1 | 12/2001 | Arney et al. |
| 6,391,418 B1 | 5/2002 | Ueda et al. |
| 6,468,620 B1 | 10/2002 | Waki et al. |
| 6,506,469 B1 | 1/2003 | Takahashi et al. |

* cited by examiner

*Primary Examiner*—Susan Berman
(74) *Attorney, Agent, or Firm*—Stein, McEwen & Bui, LLP

(57) ABSTRACT

A light-curable resin composition includes an acrylate oligomer, an acrylate monomer having 4 or less functional groups, a photopolymerization initiator, a hardness enhancing agent represented by the formula(1), m-terphenyl represented by the formula(2) and a colloidal antistatic agent. The light-curable resin composition has a high antistatic property and a light transmittance, as well as a high hardness and a low shrinkage rate.

13 Claims, No Drawings

LIGHT-CURABLE RESIN COMPOSITION HAVING ANTISTATIC PROPERTY

CROSS-REFERENCE TO RELATED APPLICATIONS

This application is a Divisional of application Ser. No. 10/317,212, filed Dec. 12, 2002, now U.S. Pat. No. 6,815,034. This application is based upon and claims the priority of Korean Patent Application No. 2002-21950, filed Apr. 22, 2002, and U.S. patent application Ser. No. 10/317,212, filed Dec. 12, 2002, the contents being incorporated herein by reference.

BACKGROUND OF THE INVENTION

1. Field of the Invention

The present invention relates to a light-curable resin composition having an antistatic property, and more particularly, to a light-curable resin composition having a low shrinkage rate and an improved tilt property.

2. Description of the Related Art

A plastic material has been widely used for electrical, electronic and optical materials etc. Examples of the plastic material include vinylchloride resin (PVC), methylmethacrylate resin (PMMA), polycarbonate resin (PC), acrylonitril-butadiene-styrene resin (ABS) and polyethyleneterephthalate resin (PET). These plastic materials have various advantages such as a light weight, a low manufacturing cost, a breakage resistance, and a moldability. Thus, they are used as a substitute for glass and metal products. However, a surface of the plastic material has a poor abrasion and chemical resistance. Thus, the surface of the plastic material is generally treated or coated to improve these unfavorable properties. For example, a light-curable resin is used as a surface treatment for plastic materials. A light-curable resin composition is photosensitive, and a monomer included in the composition polymerizes to form a polymer. Its physicochemical properties, such as solubility, viscosity and adhesivity, are changed according to photopolymerization. Particularly, it changes from a liquid state to a solid state by a light irradiation in a short period of time. The light-curable resin composition has several advantages of being useful for a mass production of an article which is hardened in a short period of time, providing a good working environment because it is not a solvent-type, and providing no thermal stress to a substrate. It is also advantageous in providing a sufficient time to set a fine part in a proper position because it does not start being cured until UV is radiated on the light-curable resin composition. Further, It is desirable in adhesivity and endurance.

A transparent plastic material is used for an optical disc, a display panel for a PDP and an LCD, and safety glasses for a protective helmet. The light-curable resin composition used to protect surfaces of these products should have a high light transmittance as well as an abrasion and chemical resistance. A plastic is electrically nonconductive, it can be charged by a friction, etc. As a result, it can be polluted with dust and deteriorate in a light transmittance. Therefore, the light-curable resin composition for a surface protection should have an abrasion resistance, a solvent and chemical resistance, a high light transmittance and antistatic property.

In addition, the light-curable resin composition should have a high hardness as well as a low shrinkage rate to maintain a required abrasion resistance and to prevent a crack during a coating process. Particularly, when the light-curable resin composition is used for a protective layer the optical disc, the light transmittance should be 90% or more at a wavelength region of a laser to maintain a certain level of a recordability of the optical disc and a shrinkage rate should be 10% or less to prevent a deformation of the optical disc. The abrasion resistance should be 2H or more of the pencil hardness to prevent the optical disc from being scratched by a finger nail, etc.

A conventional light-curable acrylate coating composition having the antistatic property comprises a conductive fine particle, an acrylate oligomer, an acrylate monomer having 6 functional groups, an acrylate monomer having 3 functional groups, an acrylate monomer having a single functional group, a photoinitiator and an adhesivity enhancing agent. When an acrylate monomer having 5 or more of functional groups is contained in a composition, the monomer is very quickly polymerized, and a polymer with the high hardness is obtained because of a large number of cross-linking. On the other hand, although a resultant polymer has a shock resistance, a coated film manufactured from the composition having the polymer can be exfoliated from a disc substrate of the optical disc due to its low flexibility, and a crack can be easily made in the coated film. Thus, the conventional composition additionally includes the adhesivity enhancing agent to prevent the exfoliation of the coated film. However, the adhesivity enhancing agent may decrease the light transmittance of the coated film, and thus the recordability of the optical disc deteriorates. Further, when a monomer having 5 or more of functional groups is included in the composition, a resultant polymer may have a crack due to its high shrinkage rate, and its tilt property becomes poor. Thus, the composition is not suitable for the optical disc.

Titania is added to the conventional composition to enhance the antistatic property. However, the titania may decrease the light transmittance. Moreover, the titania is added to the composition in a powder form, thereby resulting in a non-uniform thickness of the coating film, and an adhesiveness between the disc substrate and the coating film is not good.

An antistatic composition comprising a monomer having a quaternary ammonium salt and an acrylic group may produce the coating film which shows a color change to yellow.

It is difficult to satisfy the high abrasion resistance and the low shrinkage rate simultaneously, and the conventional light-curable resin compositions have a limitation on an application field since, although they have a relatively high abrasion resistance, they do not have a high light transmittance, the low shrinkage rate and the antistatic property simultaneously. Particularly, the conventional light-curable resin compositions are not suitable for the optical disc.

SUMMARY OF THE INVENTION

To overcome the above and other problems, the present invention provides a light-curable resin composition having a high antistatic property and a light transmittance as well as a high hardness and a lower shrinkage rate.

Additional objects and advantages of the invention will be set forth in part in the description which follows and, in part, will be obvious from the description, or may be learned by practice of the invention.

A light-curable resin composition of the present invention comprises an acrylate oligomer, an acrylate monomer having 4 or less functional groups, a photopolymerization initiator, a hardness enhancing agent represented by the formula (1), m-terphenyl represented by the formula (2) and a colloidal antistatic agent:

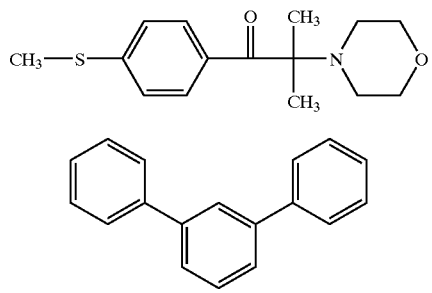

(1)

(2)

DETAILED DESCRIPTION OF THE PREFERRED EMBODIMENTS

Reference will now be made in detail to the embodiments of the present invention, specific examples and chemical formulae of which are described below.

In one aspect of the present invention, an acrylate oligomer is monofunctional or multifunctional. The acrylate oligomer is at least one selected from a group consisting of polyester acrylate, epoxy acrylate, urethane acrylate, spiran resin acrylate and silicone resin acrylate.

In one aspect of the present invention, a content of an acrylate monomer having 4 or less functional groups is about 5 to 200 parts by weight based on 100 parts by weight of the acrylate oligomer.

In another aspect of the present invention, a content of a photopolymerization initiator is about 0.1 to 10 parts by weight based on 100 parts by weight of the acrylate oligomer.

In another aspect of the present invention, a content of a hardness enhancing agent is about 1 to 8 parts by weight based on 100 parts by weight of the acrylate oligomer.

In another aspect of the present invention, a content of m-terphenyl is about 1 to 10 parts by weight based on 100 parts by weight of the acrylate oligomer.

In another aspect of the present invention, a colloidal antistatic agent includes a dispersing medium of at least one metal oxide selected from a group consisting of tin oxide, antimony-tin oxide, antimony-zinc oxide, indium-tin oxide, zinc oxide, aluminium-zinc oxide, titanium oxide, tungsten oxide, molybdenum oxide, vanadium oxide and iron oxide, and a content of the colloidal antistatic agent is about 5 to 30 parts by weight based on 100 parts by weight of the acrylate oligomer.

90% or more of the metal oxide included in the colloidal antistatic agent has a primary particle diameter of 30 nm or less.

Hereinafter, the present invention will be described in greater detail.

A light-curable resin composition of the present invention comprises the acrylate oligomer, the acrylate monomer having 4 or less functional groups, the photopolymerization initiator, the hardness enhancing agent, the m-terphenyl and the colloidal antistatic agent.

The acrylate oligomer used in the present invention is generally called a pre polymer and used as a main component of the light-curable resin composition. A photopolymerization property of the acrylate oligomer is provided by introducing one or more photoreactive functional groups to the pre polymer having a suitable molecular weight. Physicochemical properties of a cured film are greatly dependent on a molecular structure of the pre polymer. Among various kinds of photopolymerizing resin, a light-curable pre polymer of acrylates which is made by introducing (metha)acrylate groups having a double bond carrying functional groups to the polymer can be used.

The pre polymer includes polyester acrylate, epoxy acrylate, urethane acrylate, spiran resin acrylate, silicone acrylate, etc. The polyester acrylate is prepared by introducing the (metha)acrylate groups to a polyester which is obtained by reacting a polybasic acid and a tertiary alcohol, and it may be formed of various structures. The epoxy acrylate may be prepared by introducing the (metha)acrylate groups to an epoxy resin, and it is excellent in heat resistance and adhesive property. The urethane acrylate can form a strong film when contained in a polymer because it gives an aggregating effect through a hydrogen bond.

The acrylate oligomer of the present invention is used in 10 to 90 parts by weight based on a total weight of 100 parts by weight of the resin composition. If it is used less than 10 parts by weight, a crack can be made in a coating film due to its low elasticity. If it is used more than 90 parts by weight, a viscosity of the resin composition becomes higher, it is difficult to control the physicochemical properties of the film, and a compatibility with other compounds and an abrasion resistance become lowered. The monofunctional acrylate includes hydroxyethyl (metha)acrylate, hydroxypropyl (metha)acrylate, hydroxybutyl (metha)acrylate, hydroxypentyl (metha)acrylate, hydroxyhexyl (metha)acrylate, etc. In addition, the multifunctional acrylate includes trimethylolpropan di(metha)acrylate, triethylolpropane di(metha)acrylate, glycerol di(metha)acrylate, pentaerythritol tri(metha)acrylate, dipentaerythritol pentaacrylate, etc.

The resin composition according to the present invention comprises the acrylate monomer having 4 or less functional groups. The light-curable resin composition polymerizes by UV in a short period of time, thus an amount of a solvent of the resin composition is limited. If the viscosity of the resin composition is too high, it has an adverse effect on a thickness and processing conditions of the film. The viscosity of the resin composition should be controlled. Monomers having a low viscosity is favorably used to control the viscosity of the resin composition. The monomers having the low viscosity also may have an effect of changing the physicochemical properties of the film, for example, increasing the hardness. The monomers are classified into monofunctional, difunctional and multifunctional monomers according to the number of the functional groups in a molecule. Where a content of the multifunctional monomer is increased, it may act as a cross-linker. However, where the monomers having more than 4 functional groups are used, cross-linking bonds are greatly increased, thereby creating a crack due to an increase of a shrinkage rate. Specifically, the monomers having more than 4 functional groups are not suitable for an optical disc because they adversely affect tilt properties. Acrylate or metharacrylate groups are generally used as a functional group. In the present invention, the low viscosity monomers are used in an amount of 5 to 200 parts by weight based on 100 parts by weight of the acrylate oligomer. If it is used in less than 5 parts by weight, it does not have a substantial effect on controlling the viscosity of the resin composition. If it is used in more than 200 parts by weight, a curing rate of the resin composition becomes too slow. In addition, typical properties of the pre polymers are rarely shown in the cured film and the crack can be created because an elasticity of the film is too low.

The example of the low viscosity monomer of the present invention includes monomers having monofunctional groups such as hydroxyethyl (metha)acrylate, hydroxypropyl (metha)acrylate, hydroxybutyl (metha)acrylate, hydroxypentyl (metha)acrylate, hydroxyhexyl (metha)acrylate, etc. the monomers also include difunctional groups such as 1,6-hexanediol di(metha)acrylate, triphenylglycol diacrylate, butanediol diacrylate, 1,3-butylglycol dimethaacrylate, neopentylglycol diacrylate, ethyleneglycol dimethaacrylate, diethyleneglycol di(metha)acrylate, triethyleneglycol diacrylate, polyethyleneglycol di(metha)acrylate, dipropyleneglycol diacrylate, methoxylated neopentylglycol diacrylate. The monomers also include mutiple-functional groups such as trimethylolpropane tri(metha)acrylate, pentaerythrytol triacrylate, ethoxylated trimethylolproane triacrylate, propylated trimethylolproane triacrylate, glycerolpropylated trimethylolproane triacrylate, tris(2-hydroxyethyl)isocyanurate triacrylate, dipentaerythrytol hydroxypentaacrylate. One or more monomers can be used in the resin composition.

The photoinitiator of the present invention produces free radicals and catalyzes a polymerization reaction of the resin composition. It is also used as an initiator of radical polymerization and enhances a polymerization rate of the resin composition. Although the resin composition of the present invention is hardened without the photoinitiator, it is possible to use the photoinitiator to decrease a processing time. The example of the photoinitiator of the present invention includes 2-hydroxy 1,2-diphenylethanone, 2-ethoxy 1,2-diphenylethanone, 1,2-dimethoxy 1,2-diphenylethanone, 2-isopropyl 1,2-diphenylethanone, 2-butoxy 1,2-diphenylethanone, 2-isobutoxy 1,2-diphenylethanone, 2,2-dimethoxy 1,2-diphenylethanone, 1,2-dibutoxy 1-phenylethanone, 1-hydroxycyclohexylphenylketone, dimethoxyhydroxyacetophenone, 1-(4-isopropylphenyl)-2-hydroxy 2-methylpropanone, 2-methyl 1-2-morpholinorpropanone, 2-benzyl 2-dimethylamino 1-(4-morpholinophenyl) butanone and 3,6-bis{2-methyl}-2-morpholino(protanonyl)-butylcarbazole, but it is not limited to these compounds as long as it is activated by UV radiation.

The hardness enhancing agent having the formula (1) of the present invention is 2-methyl-1-{4-(methylthio)phenyl}-2-morpholinopropane-1-one. It is compatible with the acrylate oligomers and monomers of the present invention and may increase the hardness by enhancing a density of a cross-linkage. It is possible that a content of the hardness enhancing agent is about 1 to 8 parts by weight based on the 100 parts by weight of the acrylate oligomer. Where it is used less than 1 part by weight, it gives no effect on the increase of the hardness. Where it is used more than 8 parts by weight, it gives effect on a light transmittance. Thus, where the resin composition of the present invention is applied to an optical disc that requires 90% or more of the light transmittance, the content of the monomer is properly adjusted, particularly 5 or more parts by weight of the acrylate oligomer.

The m-terphenyl is used as a filler, increases the hardness of a coating film without an adverse effect on the light transmittance, and lowers the shrinkage rate, thereby preventing a crack formation in the coating film. Where applied in the optical disc, m-terphenyl also improves the tilt properties of the optical disc. It is understood that the m-terphenyl fills up a free space between the cross-linkages and thereby lowers the shrinkage rate. A content of the m-terphenyl is about 1 to 10 parts by weight based on the 100 parts by weight of the aryclate oligomer. Where it is used less than about 1 part by weight, the shrinkage rate may not be lowered. Where it is used more than about 10 parts by weight, it may decrease the light transmittance.

One or more of antistatic agents are used in the present resin composition. Examples of the antistatic agents includes tin oxide, antimony-tin oxide, antimony-zinc oxide, indium-tin oxide, zinc oxide, aluminium-zinc oxide, titanium oxide, tungsten oxide, molybdenum oxide, vanadium oxide and iron oxide. It is possible that 90% or more of the metal oxide included in the colloidal antistatic agent has a primary particle diameter of 30 nm or less to prevent the resin composition from light scattering or lowering light transmittance. It is also possible not to use water as a dispersant due to its low compatibility with a light-curable acrylate matrix. It is possible that a content of the colloidal antistatic agent is about 5 to 30 parts by weight based on the 100 parts by weight of the acrylate oligomer. Where it is used less than 5 parts by weight, the antistatic properties may not be enough. Where it is used more than 30 parts by weight, it may lower the light transmittance. It is possible to increase the content of the colloidal antistatic agent to shield an electronic wave where the resin composition is applied to coat a cellular phone. It is also possible to use 20 or less parts by weight where the resin composition is applied to a protective layer of the optical disc that requires 90% or more of the light transmittance. ITO(indium tin oxide) and/or ATO(antimony tin oxide) are typically used as the colloidal antistatic agent (conductive material). ITO is a kind of tin doped-$In_2O_3$ having an $In_2O_3$:$SnO_2$ ratio about 85:15 to 95:5.

A powder form of ITO has a particle diameter about 10 to 12 nm, and its average colloidal particle diameter is about 40 nm. Its conductivity is $1.7 \times 10^{-4}$ Ω·cm. ATO is a kind of antimony doped-$SnO_2$ having an $SnO_2$:$Sb_2O_3$ ratio about 85:15 to 95:5. Its average colloidal particle diameter is less than 80 nm. Its conductivity is $1.7 \times 10^{-3}$ Ω·cm. In addition, it is possible to use a compatiblizing agent, such as polysiloxane, to maintain conductive particles and pre polymers in a dispersed state. By maintaining the dispersed state of the conductive particles, which are fine particles, it is possible to improve a storage stability of the resin composition and prevent a crack caused by a phase separation during film formation. In a case that the compatibilizing agent is not used, a zirconium bead may be used for a uniform milling.

The resin composition of the present invention, which can be used as a coating composition for the optical disc, may have different viscosities depending on the coating process. Viscosities of the resin composition can be controlled by adding a suitable amount of a volatile solvent. In addition, the volatile solvent may enhance the adhesivity of the coating film by chemically impacting on a surface of the optical disc prior to a curing of the film. One or more solvents selected from a group consisting of alcohols, ketones and acetates, may be used as the volatile solvent. Examples of the alcohols having a monofunctional group include methanol, ethanol, isopropanol, butanol, etc. Examples of the alcohols having multifunctional groups include ethyleneglycol, propyleneglycol, etc. Examples of ketones include methylethylketone, acetone, acetylacetone, etc. Examples of the acetates include methylacetate, ethylacetate, butylacetate, etc.

The light-curable resin composition may optionally include a suitable amount of an additive, such as stabilizers, antioxidants, surfactants, antifoaming agents, labeling agents, and disinfectants.

The conventional coating process, such as deep coating, spray coating, flow coating and spin coating, may be applied in the present invention, and a suitable coating process is selected depending on a material of a substrate, a shape and a thickness of the film. For example, the flow coating is used where a portion of the substrate is coated, the spray coating is useful where a surface to be coated is complicated, the spin coating is useful where a surface to coated is flat and symmetrical. Particularly, the spin coating is typically used. The thickness of a coated layer on the optical disc varies depending on a spinning rate, a spinning time, a loading position, an amount of loading, and the viscosity of the resin composition.

A reaction mechanism of the present resin composition is as follows, however, the present invention is not limited by a particular mechanism. The photoinitiator produces the free radicals by radiation of UV light, and the free radicals attack double bonds of the various acrylate oligomers having 1 to 3 acrylate functional groups, and cross linking reactions are made by a cleavage of the double bonds. In addition, the antistatic agent used in the present resin composition gives the antistatic properties by free electrons acting as a charge transfer medium.

EXAMPLES 1–7

Preparation of the Composition

The components shown in table 1 were thoroughly mixed in a mixer and milled by using zirconium beads to respective compositions.

The units used in the Table 1 are parts by weight.

Ebecryl 264: aliphatic urethane triacrylate oligomer.

Ebecryl 284: aliphatic urethane diacrylate oligomer.

Darocur 1173c: 2-hydroxy-2-methyl-1-phenyl propane-1-one as photopolymerization initiator.

Irgacure 907:
2-methyl-1-{4-(methylthio)phenyl}-2-morpholinopropane-1-one

DPHPA: dipentaerythryltol hydroxypentaacrylate monomer

TMPTA: trimethylol propane triacrylate

COMPARATIVE EXAMPLE 1

A composition was prepared by the same process as in the Examples 1–7 except that the m-terphenyl and the hardness enhancing agent were not used.

COMPARATIVE EXAMPLE 2

A composition for film was prepared using the same process as in the Example 1 except that the dipentaerythrytol hexaacrylate was used as an acrylate monomer having 6 functional groups instead of DPHA.

COMPARATIVE EXAMPLE 3

A composition for film was prepared using the same process as in the Example 1 except that ITO was not used.

Preparation of the Optical Disc

An HD-DVD optical disc was prepared according to the following process.

A stamper having 0.32 $\mu$m track pitch of an In-groove type was used and a radius from 22 to 60 mm of a track was recorded to confirm transcription properties. A disc having a substrate of an outer diameter 120 mm and a thickness 1.1 mm was molded by extrusion, and a transcription was able to make to a position of a radius 58.6 mm. An extrusion molding was conducted in conditions of fixed and moving side temperature 125° C., sprue bush and cutting punch at a temperature of 90° C., and the temperature of the resin was up to 380° C. The extrusion molding was conducted in the above conditions and the molded product had 0.3° or less mechanical characteristics. It was confirmed that a fluid flow of the resin was stabile to an edge of the optical disc. The optical disc having 4 film layers of Ag alloy/ZnSSiO2/SbGeTe/ZnSSiO2 was made by sputtering process. A center hole of the optical disc was plugged with a capping unit of a disc shape with a 30 mm radius and a 0.3 mm thickness, and a light transmitting layer with a 0.1 mm thickness was prepared by pouring the resin for the light transmitting layer. The resin was regularly coated at a radius between 17 mm to 58.5 mm and with a thickness about 100±2 $\mu$m.

Coating Process for the Protective Layer

A film composition obtained from the examples 1–7 and Comparative Examples 1–3 of the present invention was coated by spin coating. It was spun for 10 sec at 3,000 rpm, and cured for 3 sec with a 3,000 w lamp.

The abrasion resistance, the tilt properties, the light transmittance and the antistatic properties of the optical disc, which has the protective layer according to the Examples 1–7 and Comparative Examples 1–3, were measured and the result is shown in Table 3.

TABLE 1

| Components | Example 1 | Example 2 | Example 3 | Example 4 | Example 5 | Example 6 | Example 7 |
| --- | --- | --- | --- | --- | --- | --- | --- |
| Ebecryl 264 | 100 | 100 | 100 | 100 | 100 | — | 100 |
| Ebecryl 284 | — | — | — | — | — | 100 | — |
| Darocur 1173c | 3.9 | 3.9 | 3.9 | 3.9 | 3.9 | 3.9 | 3.9 |
| Irgacure 907 | 5 | 5 | 5 | 5 | 3 | 3 | 8 |
| m-terphenly | 1 | 5 | 5 | 5 | 5 | 10 | 10 |
| ITO-sol(30%) | 10 | 5 | 10 | 20 | 30 | 30 | 30 |
| DPHPA | 100 | 100 | 100 | 100 | — | 100 | 100 |
| TMPTA | — | — | — | — | 100 | — | — |

(1) Abrasion Resistance measurement of surface strength: pencil strength corresponding to the JIS K5651-1966

(2) Amount of Tilt Change

It was measured by using a conventional device for measuring tilt angle.

(3) Surface Resistance

A surface resistance was measured according to the JIS K-6911

(4) Light Transmittance

A mean transmittance of a light in the region of 404 nm was measured by using a UV spectrometer.

(5) Water Resistance and Solvent Resistance

A film was formed on the molded plastic substrate and then it was respectively immersed into water, ethylalcohol, isopropyl alcohol and 5% saline water at 40° C. for 48 hours. The film was investigated after 48 hours of immersion.

o: No exfoliation or crack

Δ: Some crack formation

As shown in the above experimental results, the light-curable resin composition has the high abrasion resistance, the antistatic properties, 90% or more of the light transmittance in the region 405 nm wavelength and 10% or less of the shrinkage rate. Therefore, the resin composition is suitable for the optical disc. In addition, a record retrieval experiment result was consistent with a 17–58 mm radial distance of the optical disc.

TABLE 2

| Examples | Abrasion resistance | Amount of Tilt change (α angle) | Surface resistance (Ω/cm2) | Light transmittance (%) | Water and solvent resistance |
|---|---|---|---|---|---|
| Example 1 | 2.3 H | 0.31 | $10^9$ | 97 | 0 |
| Example 2 | 2.7 H | 0.30 | $10^{12}$ | 98 | 0 |
| Example 3 | 2.8 H | 0.26 | $10^9$ | 97 | 0 |
| Example 4 | 3.1 H | 0.23 | $10^7$ | 93 | 0 |
| Example 5 | 2.8 H | 0.22 | $10^6$ | 90 | 0 |
| Example 6 | 3.0 H | 0.19 | $10^6$ | 90 | 0 |
| Example 7 | 3.7 H | 0.23 | $10^6$ | 90 | 0 |
| Comparative example 1 | 1.6 H | 0.30 | $10^9$ | 97 | 0 |
| Comparative example 2 | 2.8 H | 0.45 | $10^9$ | 97 | 0 |
| Comparative example 3 | 2.1 H | 0.33 | $10^{12}$ | 99 | 0 |

INDUSTRIAL APPLICABILITY

The light-curable resin composition of the present invention has a high hardness as well as a low shrinkage rate, and thus it resulted in an excellent abrasion resistance and adhesivity to a substrate as well as a low possibility to make a crack at a more than certain thickness of the film and an excellent tilt property, which is necessarily required for the optical disc.

The light-curable resin composition of the present invention is useful for lenses for a clock, a Brownian tube for a TV or monior, display panel for PDP or LCD and safety glasses for a protective helmets. It can be useful for a cellular phone because it has an electronic wave shielding effect depending on the amount of antistatic composition.

Although a few preferred embodiments of the present invention have been shown and described, it would be appreciated by those skilled in the art that changes may be made in this embodiment without departing from the principles and sprit of the invention, the scope of which is defined in the claims and their equivalents.

What is claimed is:

1. A light-curable resin composition comprising an acrylate oligomer, a monomer having 4 or less ethylenically unsaturated functional groups, a photopolymerization initiator, a hardness enhancing agent represented by the formula (1), m-terphenyl represented by the formula(2) and a colloidal antistatic agent:

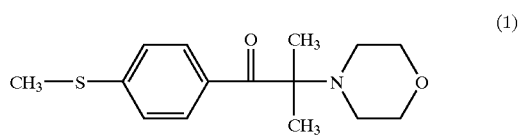

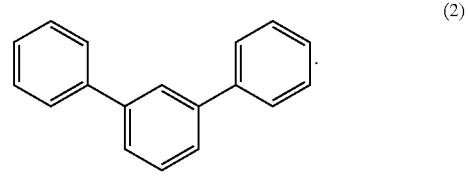

2. The light-curable resin composition of claim 1, wherein the acrylate oligomer is mono- or multi-functional and comprises:
at least one oligomer selected from a group consisting of polyester acrylate, epoxy acrylate, urethane acrylate, spiran resin acrylate, and silicone resin acrylate.

3. The light-curable resin composition of claim 1, wherein a content of the monomer having 4 or less ethylenically unsaturated functional groups is in a range of about 5 to 200 parts by weight based on 100 parts by weight of the acrylate oligomer.

4. The light-curable resin composition of claim 1, wherein a content of the photopolymerization initiator is in a range of about 0.1 to 10 parts by weight based on 100 parts by weight of the acrylate oligomer.

5. The light-curable resin composition of claim 1, wherein a content of the hardness enhancing agent is in a range of about 1 to 8 parts by weight based on 100 parts by weight of the acrylate oligomer.

6. The light-curable resin composition of claim 1, wherein a content of the m-terphenyl is in a range of about 1 to 10 parts by weight based on 100 parts by weight of the acrylate oligomer.

7. The light-curable resin composition of claim 1, wherein the colloidal antistatic agent comprises at least one metal oxide selected from a group consisting of tin oxide, antimony-tin oxide, antimony-zinc oxide, indium-tin oxide, zinc oxide, aluminium-zinc oxide, titanium oxide, tungsten oxide, molybdenum oxide, vanadium oxide and iron oxide, and a content of the colloidal antistatic agent is 5 to 30 parts by weight based on 100 parts by weight of the acrylate oligomer.

8. The light-curable resin composition of claim 1, wherein the colloidal antistatic agent comprises:
90% or more of particles having a primary particle diameter of 30 nm or less.

9. The light-curable resin composition of claim 1, wherein the monomer comprises:
a monofunctional acrylate selected from the group consisting of hydroxyethyl (meth)acrylate, hydroxypropyl (meth)acrylate, hydroxybutyl (meth)acrylate, hydroxpentyl (meth)acrylate, hydroxyhexyl (meth)acrylate, and mixtures thereof.

10. The light-curable resin composition of claim 1, wherein the monomer comprises:
a difunctional acrylate selected from the group consisting of 1,6-hexanediol di(meth)acrylate, triphenylglycol diacrylate, butanediol diacrylate, 1,3-butylglycol dimethacrylate, neopentylglycol diacrylate, ethyleneglycol dimethacrylate, diethyleneglycol di(meth)acrylate, triethyleneglycol diacrylate, polyethyleneglycol di(meth)acrylate, dipropyleneglycol diacrylate, methoxylated neopentylglycol diacrylate, and mixtures thereof.

11. The light-curable resin composition of claim 1, wherein the monomer comprises:
   a multifunctional acrylate selected from the group consisting of trimethylolpropane tri(meth)acrylate, pentaerythrytol triacrylate, ethoxylated trimethylolproane triacrylate, propylated trimethylolproane triacrylate, glycerolpropylated trimethylolproane triacrylate, tris(2-hydroxyethyl)isocyanurate triacrylate, dipentaerythrytol hydroxypentaacrylate and mixtures thereof.

12. The light-curable resin composition of claim 1, wherein the photopolymerization initiator is selected from the group consisting of 2-hydroxy 1,2-diphenylethanone, 2-ethoxy 1,2-diphenylethanone, 1,2-dimethoxy 1,2-diphenylethanone, 2-isopropyl 1,2-diphenylethanone, 2-butoxy 1,2-diphenylethanone, 2-isobutoxy 1,2-diphenylethanone, 2,2-dimethoxy 1,2-diphenylethanone, 1,2-dibutoxy 1-phenylethanone, 1-hydroxycyclohexylphenylketone, dimethoxyhydroxyacetophenone, 1-(4-isopropylphenyl)-2-hydroxy 2-methylpropanone, 2-methyl 1-[4-(methylthio)phenyl]-2-morpholinorpropanone, 2-benzyl 2-dimethylamino 1-(4-morpholinophenyl) butanone and 3,6-bis[2-methyl]-2-morpholino(protanonyl)-butylcarbazole.

13. The light-curable resin composition of claim 1, further comprising:
   an additive selected from the group consisting of a stabilizer, an antioxidant, a surfactant, an antifoaming agent, a labeling agent, and a disinfectant.

* * * * *